(12) United States Patent
Shipp et al.

(10) Patent No.: US 6,311,723 B1
(45) Date of Patent: Nov. 6, 2001

(54) FLOW CONTROL VALVE ASSEMBLY

(75) Inventors: David Shipp, Eudlo; Robert Turner, Caloundra, both of (AU)

(73) Assignee: Multiflo Australia Pty Ltd., Caloundra (AU)

( * ) Notice: Subject to any disclaimer, the term of this patent is extended or adjusted under 35 U.S.C. 154(b) by 0 days.

(21) Appl. No.: 09/478,435

(22) Filed: Jan. 6, 2000

(30) Foreign Application Priority Data

May 27, 1999  (AU) .................................................. PQ0602

(51) Int. Cl.[7] .......................... F16K 31/122; F16K 31/24; F16K 33/00
(52) U.S. Cl. ........................... 137/413; 137/441; 141/198
(58) Field of Search .................................... 137/412, 413, 137/414, 415, 446, 441; 141/198

(56) References Cited

U.S. PATENT DOCUMENTS

| | | | | |
|---|---|---|---|---|
| 2,477,186 | * | 7/1949 | Koehler | 137/413 |
| 2,528,499 | * | 11/1950 | Davies | 137/413 |
| 3,062,230 | * | 11/1962 | Becht | 137/413 |
| 3,625,264 | * | 12/1971 | Swain | 141/198 |
| 3,929,155 | * | 12/1975 | Garretson | 137/430 |
| 4,064,907 | * | 12/1977 | Billington et al. | 137/446 |
| 4,142,552 | * | 3/1979 | Brown et al. | 137/446 |
| 4,305,422 | * | 12/1981 | Bannink | 137/415 |
| 4,830,042 | * | 5/1989 | Cho | 137/413 |
| 5,282,496 | * | 2/1994 | Kerger | 141/198 |
| 5,460,197 | * | 10/1995 | Kerger et al. | 137/413 |
| 5,487,404 | * | 1/1996 | Kerger | 137/413 |
| 5,842,500 | * | 12/1998 | Rockwood et al. | 137/413 |
| 5,850,849 | * | 12/1998 | Wood | 137/446 |

FOREIGN PATENT DOCUMENTS

| | | |
|---|---|---|
| 0 144 549 | 6/1985 | (EP) . |
| 1 153 381 | 5/1969 | (GB) . |
| 1 193 007 | 5/1970 | (GB) . |
| 1 335 188 | 10/1973 | (GB) . |
| 1 440 107 | 6/1976 | (GB) . |
| 1 541 110 | 2/1979 | (GB) . |
| 2 317 382 | 3/1998 | (GB) . |

* cited by examiner

Primary Examiner—George L. Walton
(74) Attorney, Agent, or Firm—Browdy and Neimark

(57) ABSTRACT

A fluid flow control valve (10) has a piston (43) in a first chamber (45), urged by a spring (46) to close fluid passages (36) interconnecting the first chamber (45) to a second chamber (51). A fluid level sensor (20) in a container (100) allows fluid to be bled from a downstream side of the first chamber (45), via a bleed passage (45), to enable the piston (43) to move to open the fluid passages (36). When the fluid sensor (20) detects that the fluid level (101) in the container (100) has reached a preset level, the fluid level sensor (20) shuts off flow through the bleed passage (45) and the equalization of the fluid pressure on both sides of the piston (43) in the first chamber (45) enables the spring (46) to move the piston (43) to close the fluid passages (36), shutting off fluid flow through the valve (40).

8 Claims, 4 Drawing Sheets

FLOW CONTROL VALVE ASSEMBLY

BACKGROUND OF THE INVENTION

1. Field of the Invention

THIS INVENTION relates to a flow control valve assembly.

The invention particularly relates to, but is not limited to, a flow control valve assembly to protect containers against over-filling with fluids (or liquids); and to a flow control valve therefor.

The term "container" shall be used to include a tank, drum, fluid (or fuel) cell, fluid (or fuel) bladder or other suitable storage device for liquids.

2. Prior Art

To rapidly fill containers, liquids, such as fuels, (eg., diesel, petrol), are pumped under pressure into the containers. A supply hose, connected to the outlet of a pressure pump, is usually provided with a flow nozzle releasably connectable to a flow coupling on the container. The flow nozzles are usually provided with shut-off valves to stop the flow of liquid to the container when the container are full. However, experience has shown that the operators have a habit of manually over-riding the shut-off valves, as the shut-off valves may "trip" before a containers are full.

In some instances, eg., when filling the fuel tanks on large equipment, eg., excavators and mining equipment, the operators have manually over-ridden the shut-off valves to the extent that the fluid pressure has caused the fuel tanks to bulge and, even rupture. Clearly, the damage to the tanks, and the loss of fuel, is unacceptable.

SUMMARY OF THE PRESENT INVENTION

It is an object of the present invention to provide a flow control valve which cannot be manually over-ridden.

It is a preferred object of the present invention to provide such a control valve in the liquid coupling connected to the flow nozzle.

It is a further preferred object to provide such a valve which is connected to a fluid level sensor in the container, where the sensor operates the valve to shut off the fluid flow when the fluid level in the container reaches a preset level.

It is a further preferred object of the present invention to provide such a flow control valve assembly which is suitable for installation on new containers, or which can be retrofitted to existing containers.

It is a still further preferred object of the present invention, to provide such an assembly which is relatively inexpensively manufacture and install, and which is reliable and has low maintenance requirements.

Other preferred objects of the present invention will become apparent from the following description.

In one aspect, the present invention resides in a flow control valve (for fluids) including:

a valve body having a first chamber connected at or adjacent one end to a fluid inlet, the fluid inlet being connectable to a source of fluid under pressure, and a second chamber connected to a fluid outlet, the fluid outlet being connectable to a container (as hereinbefore defined) to be filled with fluid;

at least one fluid passage or fluid port interconnecting the first and second chambers;

a bleed passage, at or adjacent an opposite end of the first chamber, connectable to a fluid level sensor in the container; and a piston, having at least one bleed hole therethrough, urged towards a first position closing the fluid passage(s) or fluid port(s) by a resilient member; so arranged that:

when the fluid level sensor senses that the fluid level in the container is below a preset level, a portion of the fluid from the fluid inlet is bled through the bleed port(s) in the piston and through the bleed passage, to enable the fluid pressure to move the piston to a second position, against the resilient member, allowing the fluid to flow from the fluid inlet through the first chamber, the fluid passage(s) or fluid port(s), and then through the second chamber to the outlet; but when the fluid level sensor senses that the fluid level has reached (or exceeded) a preset level, the fluid level sensor shuts off the fluid flow through the bleed passage to equalise the fluid pressure on both sides of the piston in the first chamber, and the resilient member urges the piston to the first position to shut off the flow of fluid from the fluid inlet to the fluid outlet and thereby the fluid flow from the fluid source to the container.

Preferably, the valve body is assembled from two or three valve body portions, which are preferably screw-threadably connected together.

Preferably, a head body portion incorporates a coupling member releasably couplable to a fluid nozzle. (The head body portion may be omitted, where the coupling member is fitted to an end wall of a central body portion.)

Preferably, the central body portion forms the first chamber, in which the piston is mounted; and where the resilient member, in the form of a compression coil spring (or like resilient component) urges the piston to a first position closing one or more fluid passages through a cylindrical wall of the chamber.

Preferably, a bleed passage is provided at the (downstream) end of the first chamber and is connectable, eg., by a bleed pipe or hose, to the fluid level sensor, which may comprise a float valve (or other suitable fluid sensing means) incorporating a valve which can control the fluid flow through the fluid bleed passage.

Preferably, the tail body portion, which defines the second chamber, at least partially surrounds the central body portion to permit the fluid to flow through the fluid passage(s) or port(s) to a fluid outlet connectable, eg., by a hose or pipe, to the container.

In a second aspect, the present invention resides in a fluid flow control assembly including:

a flow control valve as hereinbefore described; and a fluid level sensor, mountable in or on the fluid container and operably connected to the fluid bleed passage.

BRIEF DESCRIPTION OF THE DRAWINGS

To enable the invention to be fully understood, a preferred embodiment will now be described with reference to the accompanying drawings, in which.

DETAILED DESCRIPTION OF THE PREFERRED EMBODIMENTS

Figure 1:
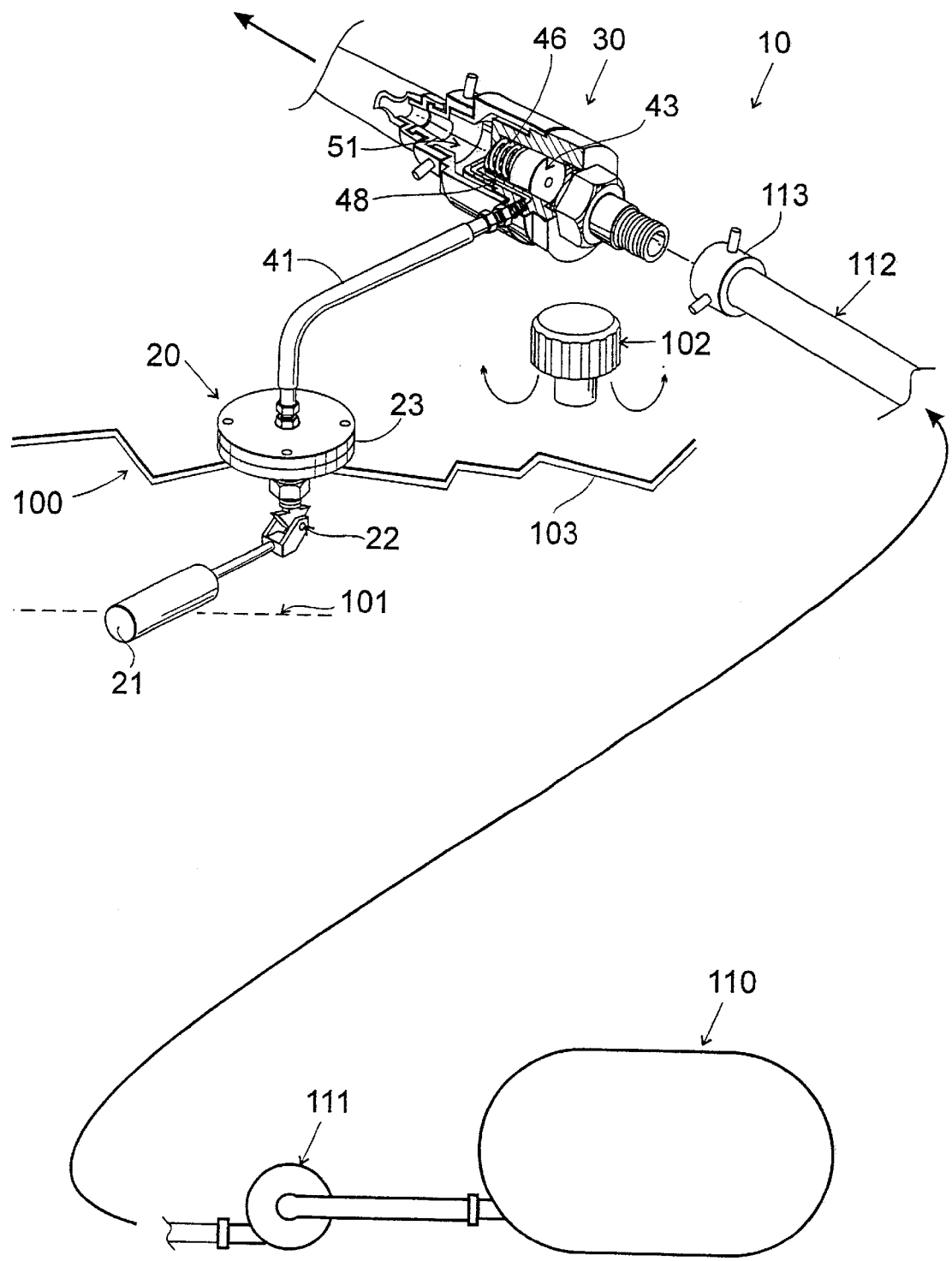
FIG. 1 illustrates the installation of the fluid control valve assembly on a tank.
Figure 2:
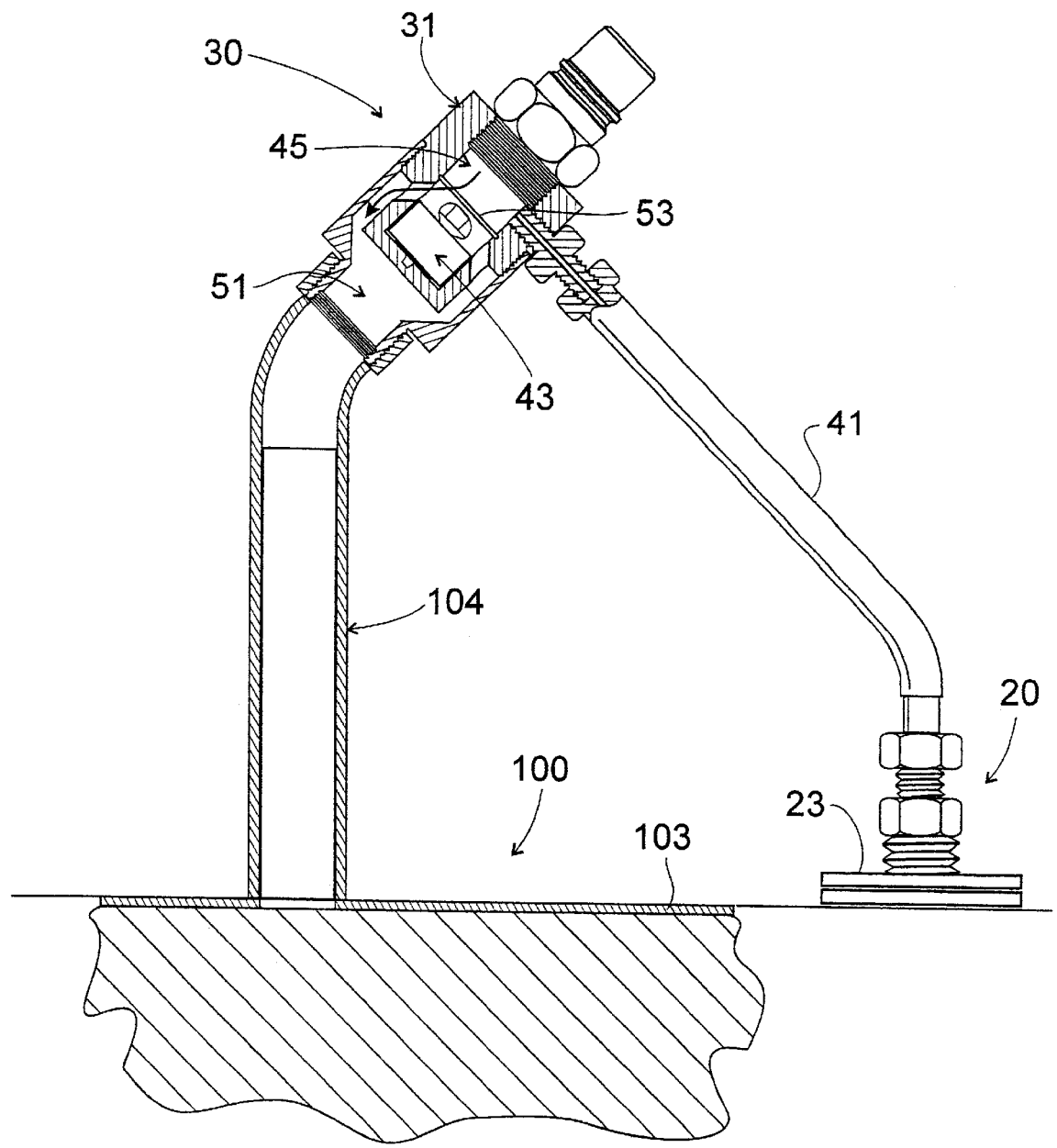
FIGS. 2 and 3 are respective sectional side view where the piston in the fluid flow control valve is shown in its first and second positions, respectively.
Figure 3:
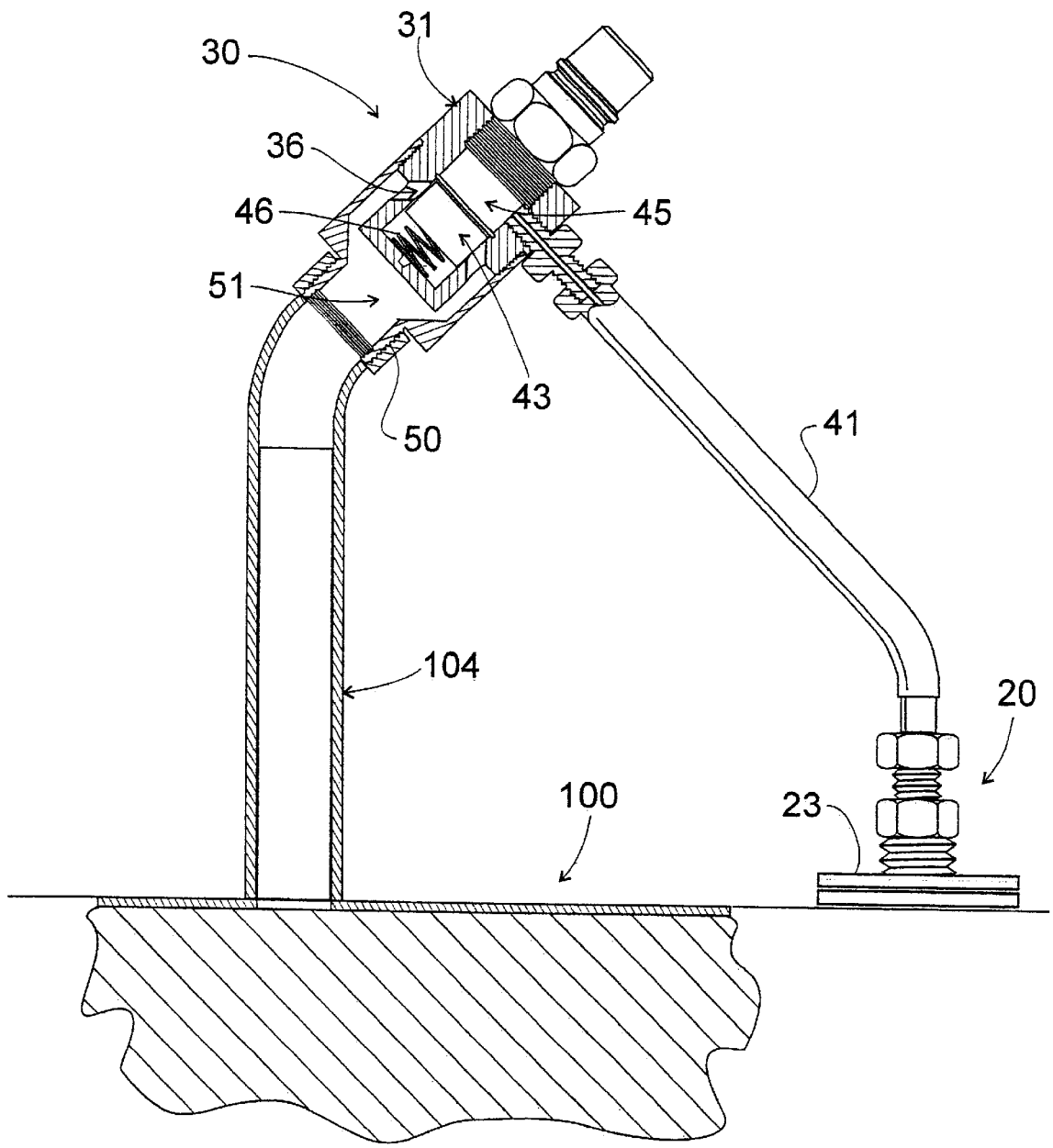

Referring to FIGS. 1 to 4, the fluid flow assembly 10 is mounted on a fuel tank 100 which is to be filled to a pre-set fluid level 101. A breather 102 on the top wall 103 allows air to escape as fuel is pumped into the tank via an inlet pipe 104. The fuel is supplied from a storage tank 110 under pressure from a pump 111 to a filling nozzle 112. The filling nozzle 112 has an internal shut-off valve and has the female portion 113 of a releasable fluid coupling (the male portion being provided by the fluid flow control assembly 10).

The fluid level in the tank 100 is monitored by a fluid level sensor 20 mounted under the top wall 103 of the tank 100 and a float 21 is operable to close a flow valve assembly 22 when the fluid level in the tank reaches (or exceeds) a preset level 101. The mounting base 23 of the fluid level sensor assembly 20 is sealably mounted to the top wall 103 of the tank.

Figures 4, 5:
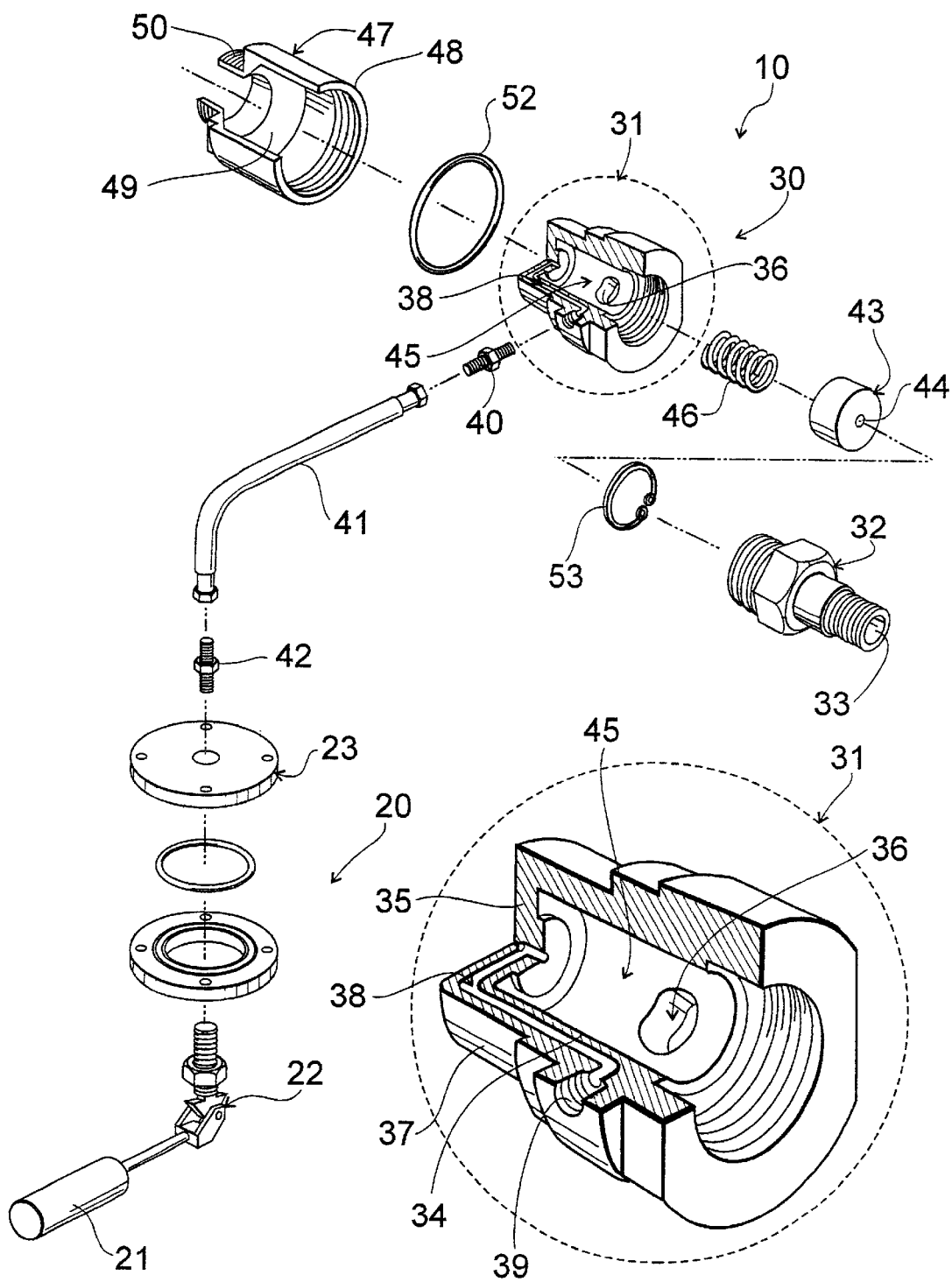
FIG. 4 is an exploded view of the components of the fluid flow valve assembly.
FIG. 5 is a sectional view, on an enlarged scale, of the central portion of the flow control valve body.

A flow control valve 30 has a valve body where a central body portion 31, shown in enlarged detail in FIG. 5, is screw-threaded at one end to receive a head body portion 32, provided with the male coupling member 33 of the releasable fluid coupling. (The male coupling member could be fitted to a screw-threaded bore in an end wall of the central body portion 31.) The central body portion 31 has a substantially plain bore 34 and is closed at its downstream end by an end wall 35. At least one fluid passage 36 extends through the cylindrical wall 37 of the central portion, while a fluid bleed passage 38 extends from the end wall 35 and through the cylindrical side wall 37, to an outlet 39 adapted to receive a fitting 40 at one end of a fluid bleed pipe 41, having a fitting 42 at the other end connected to the fluid level sensor 20.

A piston 43, having a bleed passage 44 therethrough, is slidably received in the plain bore 34 of the first chamber 45 within the central body portion 31.

A compression coil spring 46 is interposed between the end wall 35 and the piston 43, and is operable to urge the piston 43 to a first position in the first chamber 45 where it closes the fluid passages 36.

A tail body portion 47 has a cylindrical wall 48 screwthreadably engaged with the exterior of the wall 37 of the central body portion to form a second chamber 51 connected to the first chamber 45 by the fluid passages 36. An end wall 49 has a screwthreaded peripheral flange 50 to enable coupling of the flow control valve 30 to the inlet pipe 104.

An O-ring seal 52 seals the valve body portions 31, 47 together; and a circlip 53, in the first chamber 45, limits the movement of the piston within the first chamber 45.

Fluid can flow from the first chamber 45 through the fluid passages 36 to the second chamber 51 to the inlet pipe 104.

The operation of the flow control valve assembly will now be described.

The flow control valve assembly is installed as illustrated in FIGS. 1 to 4.

When the filling nozzle 112 is connected to the male coupling 33, and fluid is pumped under pressure by the pump 111, the fluid pressure on the upstream face of the piston 43 moves the piston, against a compression spring 46 towards the end wall 35 (ie., a second position) to open the fluid passages 36. The fluid flows from the first chamber 45, through the fluid passages 36, to the second chamber 51, and then through the fluid inlet pipe 104 to the tank 103.

A portion of the fluid passes through the bleed hole 44 (in the piston 43) and flows through the bleed passage 38, via bleed pipe 41 to the tank 103, the valve member 22 in the fluid level sensor 20 being held open by the valve float 21.

When the valve float 21 senses that the fluid level has reached the preset level 101, it closes the valve member 22 which prevents fluid flow through the bleed passage 38. The pressures on both sides of the piston 43 (in fuel chamber 45) become equalised, and the compression spring 46 urges the piston back to the first position where it closes the fluid passages 36, to prevent any further fluid flow through the flow valve 30 (and the inlet pipe 104) to the tank.

Even if the operator attempts to manually override the automatic shut-off valve in the flow nozzle 112, further flow of the fluid to the tank 100 is prevented by the flow control valve 30. By selective adjustment of the operation of the valve float 21, the preset level 101 in the tank 100 may be easily set.

It will be readily apparent to the skilled addressee that the fluid flow control valve assembly 10 can ensure that the tank 100 (or other container fitted with the assembly) cannot be over-filled.

The assembly 10 can be readily installed in new tanks or containers, or be retrofitted to existing containers where the only additional hole required may be a hole in the top wall 103 to enable the installation of the fluid level sensor 20, as the flow control valve 30 may be fitted (in line) between the existing inlet pipe (or fitting) 104 and the male fluid coupling 33 connectable to the female coupling 113 on the fluid nozzle 112.

If any foreign material should enter the flow control valve 30, the flow control valve can be easily disassembled to enable removal of the foreign body. In addition, springs 46 having different compression characteristics may be easily substituted in the valve 30 to control the flow control characteristics.

Various changes and modifications may be made to the embodiments described and illustrated without departing from the present invention.

We claim:

1. A fluid flow control valve mountable on a container to be filled with fluid, the fluid flow control valve comprising:
   a valve body;
   a first chamber in the valve body connected at or adjacent an upstream end to a fuel inlet, the fuel inlet being connectable to a source of fluid under pressure, the first chamber having a plain bore defined by a cylindrical wall and closed at a downstream end by an end wall;
   a second chamber in the valve body connected to a fluid outlet, the fluid outlet being connectable to the container to be filled with fluid, the second chamber at least partially surrounding the cylindrical wall of the first chamber;
   at least one fluid passage or fluid port through the cylindrical wall interconnecting the first and second chambers;
   a bleed passage in the cylindrical wall of the first chamber, having a bleed passage inlet in the end wall of the first chamber and a bleed passage outlet connectable to a remote fluid level sensor in the container;
   a piston, having at least one bleed port therethrough, slidably received in the plain bore of the first chamber; and
   a resilient member urging the piston to a first position where a side wall of the piston closes the fluid passage(s) or fluid port(s) through the cylindrical wall of the first chamber; so arranged that:
     when the fluid level sensor senses that a fluid level in the container is below a pre-set level, a portion of the fluid from the fluid inlet is bled through the bleed port(s) in the piston and through the bleed passage, to enable a fluid pressure difference between the upstream and downstream ends of the first chamber to move the piston to a second position, against the resilient member, allowing the fluid to flow from the fluid inlet, through the upstream end of the first chamber, through the fluid passage(s) or fluid port(s), and then through the second chamber to the fluid outlet; but when the fluid level sensor senses that the fluid level has reached or exceeded the preset level, the fluid level sensor shuts off the fluid flow through the bleed passage to equalize the pressure on both ends of the piston in the first chamber, and the resilient member urges the piston to the first position to shut off the flow of fluid from the fluid inlet to the fluid outlet and thereby the fluid flow from the fluid source to the container, closure of the fluid passage (s) or fluid port(s) by the side wall of the piston, when the piston is in the first position, preventing backflow of the fluid from the fluid outlet to the fluid inlet, if the fluid pressure at the fluid outlet exceeds the fluid pressure at the fluid inlet.

2. A flow control valve as claimed in claim 1 wherein:

the valve body is assembled from two or three valve body portions, which are screw-threadably connected together.

3. A flow control valve as claimed in claim 2 wherein:

a head body portion incorporates a coupling member releasably couplable to a fluid nozzle.

4. A flow control valve as claimed in claim 2 wherein:

the coupling member is fitted to an end wall of a central body portion.

5. A flow control valve as claimed in claim 2 wherein:

a central body portion forms the first chamber; and where the resilient member, in the form of a compression coil spring, or like resilient component, urges the piston to the first position.

6. A flow control valve as claimed in claim 1 wherein:

the bleed passage is connectable, by a bleed pipe or hose, to the fluid level sensor, which comprises a float valve or other suitable fluid sensing means incorporating a valve which can control the fluid flow through the fluid bleed passage.

7. A flow control valve as claimed in claim 5 wherein:

a tail body portion, which defines the second chamber, at least partially surrounds the central body portion to permit the fluid to flow through the fluid passage(s) or port(s) to the fluid outlet connectable, by a hose or pipe, to the container.

8. A fluid flow control assembly including:

a fluid flow control valve as claimed in claim 1; and a fluid level sensor, mountable in or on the fluid container and operably connected to the fluid bleed passage.

* * * * *

UNITED STATES PATENT AND TRADEMARK OFFICE
CERTIFICATE OF CORRECTION

| | | |
|---|---|---|
| PATENT NO. | : 6,311,723 B1 | Page 1 of 1 |
| APPLICATION NO. | : 09/478435 | |
| DATED | : November 6, 2001 | |
| INVENTOR(S) | : David Shipp and Robert Turner | |

It is certified that error appears in the above-identified patent and that said Letters Patent is hereby corrected as shown below:

At column 1, line 22, replace "are" with --is--.

At column 1, line 25, replace "a" with --the--.

At column 1, line 50, replace "inexpensively" with --inexpensive to--.

At column 2, line 16, replace "equalise" with --equalize--.

At column 4, line 3, replace "equalised" with --equalized--.

At column 6, line 1, replace "claim 2" with --claim 3--.

Signed and Sealed this
Fifth Day of July, 2011

David J. Kappos
*Director of the United States Patent and Trademark Office*